US010261655B2

(12) United States Patent
Toussaint et al.

(10) Patent No.: US 10,261,655 B2
(45) Date of Patent: Apr. 16, 2019

(54) LEAST DISRUPTIVE ICON DISPLACEMENT

(71) Applicant: Microsoft Technology Licensing, LLC, Redmond, WA (US)

(72) Inventors: Andres Antonio Toussaint, Sammamish, WA (US); John C. Whytock, Portland, OR (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 375 days.

(21) Appl. No.: 14/583,498

(22) Filed: Dec. 26, 2014

(65) Prior Publication Data

US 2016/0188161 A1    Jun. 30, 2016

(51) Int. Cl.
| G06F 3/048 | (2013.01) |
| G06F 3/0481 | (2013.01) |
| G06F 3/0482 | (2013.01) |
| G06F 3/0486 | (2013.01) |
| G06F 3/0488 | (2013.01) |
| G06F 3/0484 | (2013.01) |

(52) U.S. Cl.
CPC ........ *G06F 3/04817* (2013.01); *G06F 3/0482* (2013.01); *G06F 3/0486* (2013.01); *G06F 3/04842* (2013.01); *G06F 3/04886* (2013.01)

(58) Field of Classification Search
CPC .................................................... G06F 3/0481
USPC ........................................ 715/243, 798, 253
See application file for complete search history.

(56) References Cited

U.S. PATENT DOCUMENTS

| 5,712,995 | A | 1/1998 | Cohn | |
| 6,530,073 | B2 | 3/2003 | Morgan | |
| 7,120,868 | B2* | 10/2006 | Salesin | ............. G06F 17/30905 |
| | | | | 707/E17.121 |
| 7,395,510 | B2* | 7/2008 | Diwan | .................. G06F 17/212 |
| | | | | 715/801 |

(Continued)

FOREIGN PATENT DOCUMENTS

EP       2790096 A2    10/2014

OTHER PUBLICATIONS

"International Search Report and Written Opinion Issued in PCT Application No. PCT/US2015/067237", dated Mar. 31, 2016, 13 Pages.

(Continued)

*Primary Examiner* — Andrey Belousov
(74) *Attorney, Agent, or Firm* — Newport IP, LLC; Michael R. Cicero

(57) ABSTRACT

Least disruptive icon displacement techniques are described herein which enable rearrangement of icons by selectively applying multiple different displacement strategies for handling of displacement events (e.g., moving or adding icons). In one or more implementations, initiation of a displacement event to position an icon within an arrangement of icons is detected. Responsive to the detection, multiple available displacement strategies implemented by the computing platform are evaluated and a displacement strategy for rearrangement of the arrangement to position the icon is selected. Selection of the displacement strategy is based on an assessment of a level of disruption caused by the different displacement strategies to identify a least disruptive option. Then, rearrangement of the arrangement of icons is controlled using the displacement strategy that is selected.

20 Claims, 10 Drawing Sheets

(56) References Cited

U.S. PATENT DOCUMENTS

| | | |
|---|---|---|
| 7,594,204 B1 | 9/2009 | Singh et al. |
| 8,402,381 B2 | 3/2013 | Berg et al. |
| 2013/0047118 A1 | 2/2013 | Hooper et al. |
| 2013/0120464 A1 | 5/2013 | Wei et al. |
| 2013/0167073 A1* | 6/2013 | Ari .................. G06F 3/0481 715/798 |
| 2013/0167080 A1 | 6/2013 | Ari et al. |
| 2014/0225839 A1 | 8/2014 | Dunphy et al. |

OTHER PUBLICATIONS

"Collection View Programming Guide for iOS", retrieved from https://developer.apple.com/library/ios/documentation/WindowsViews/Conceptual/CollectionViewPGforIOS/CreatingCustomLayouts/CreatingCustomLayouts.html on Oct. 17, 2014, Jan. 21, 2013, 8 pages.

"Rearranging Tiles on Start", Retrieved from <http://windows.microsoft.com/en-us/windows-8/rearrange-tiles-start> on Mar. 8, 2013, Oct. 25, 2012, 2 pages.

"Using Grid Layout", retrieved from http://www.webnms.com/webnms/help/developer_guide/provisioning_framework/setting_layouts/prov_usinggridlayout.html on Oct. 17, 2014, 2 pages.

Ashrafizadeh, et al., "Structured Grid Generation Via Constraint on Displacement of Internal Nodes", Proceedings: In International Journal of Basic & Applied Sciences, vol. 11, No. 4; retrieved from http://www.ijens.org/Vol_11_1_04/119504-8686-IJBAS-IJENS.pdf on Oct. 17, 2014, Aug. 2011, 9 pages.

Duffy, "Get Organized: Windows 8 Tiles", retrieved from http://www.pcmag.com/article2/0,2817,2411468,00.asp on Oct. 17, 2014, Oct. 29, 2012, 6 pages.

Duffy, "How to Move Windows 8 Tiles—Get Organized: Windows 8 Tiles", retrieved from http://www.pcmag.com/article2/0%2c2817%2c2411469%2c00.asp on Oct. 17, 2014, Oct. 29, 2012, 3 pages.

Gin, "COSC 414: The Grid—Arranging Information in Space and Time", retrieved from http://www.cosc.canterbury.ac.nz/wolfgang.kreutzer/cosc414/grid.pdf on Oct. 17, 2014, 13 pages.

Ng, "Create Grid Layout Using UICollectionView in iOS 6", retrieved from http://www.appcoda.com/ios-programming-uicollectionview-tutorial/ on Oct. 17, 2014, Jan. 12, 2013, 25 pages.

"Second Written Opinion", Application No. PCT/US2015/067237, dated Nov. 21, 2016, 7 pages.

"International Preliminary Report on Patentability", Application No. PCT/US2016/067237, dated Mar. 15, 2017, 8 pages.

* cited by examiner

LEAST DISRUPTIVE ICON DISPLACEMENT

BACKGROUND

User interfaces for computing devices including mobile devices have evolved to simplify navigation of and interaction with settings, applications, files and other content items associated with the devices. For instance, in order to provide an efficient and easy-to-use environment, modern devices largely forego text-based user interfaces and command-line user interfaces in favor of graphical user interfaces that utilize icons to represent and enable selectable access to underlying content items. For example, a start or launch screen for a mobile device may be configured to include an arrangement of icons as representations of content items from a file structure of the file system that are managed by the operating system. Some traditional devices, though, provide a fixed arrangement of icons for device applications, which limits users' ability to customize the user interfaces. Additionally, little or no control may be provided to users to change the sizes or positions of icons in traditional arrangements. Consequently, users may be unable to adapt the arrangement of icons to create a user experience that is tailored and intuitive to use.

SUMMARY

Least disruptive icon displacement techniques are described herein which enable rearrangement of icons that represent a collection of content items. The rearrangement occurs by enabling and selectively applying multiple different displacement strategies for handling of displacement events (e.g., moving or adding icons). In one or more implementations, initiation of a displacement event to position an icon within an arrangement of icons contained in a user interface for a computing platform is detected. Responsive to the detection, multiple available displacement strategies implemented by the computing platform are evaluated and a displacement strategy for rearrangement of the arrangement to position the icon is selected based on the evaluation of the multiple available displacement strategies. Then, rearrangement of the arrangement of icons is controlled using the displacement strategy that is selected. In one approach, selection of a displacement strategy is based on an assessment of a level of disruption caused by the different displacement strategies. This may occur by checking disruptiveness of each strategy with respect to a particular rearrangement and selecting the least disruptive option. In addition or alternatively, displacement strategies may be checked in an established order from least to most perceived disruptiveness, in which case the first strategy checked that can successfully execute the rearrangement is selected.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
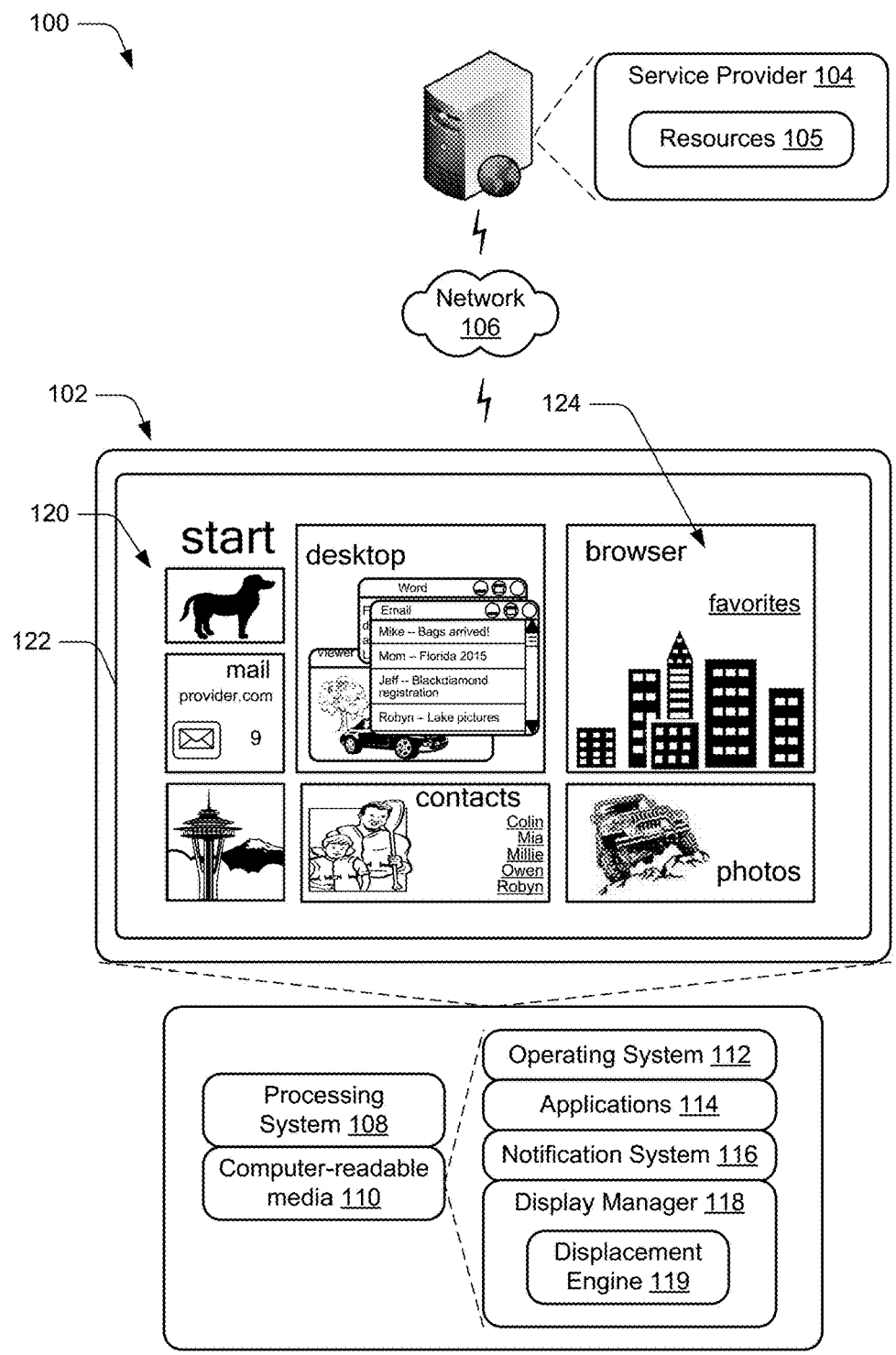
FIG. 1 illustrates an example operating environment for least disruptive icon displacement in accordance with one or more implementations.

Some traditional devices provide a fixed arrangement of icons for device applications, which limits users' ability to customize the user interfaces. Additionally, little or no control is provided to users to change the sizes or positions of icons in traditional arrangements. Consequently, users may be unable to adapt the arrangement of icons to create a user experience that is tailored and intuitive to use.

Least disruptive icon displacement techniques are described herein which enable rearrangement of icons that represent a collection of content items. The rearrangement occurs by enabling and selectively applying multiple different displacement strategies for handling of displacement events (e.g., moving or adding icons). In one or more implementations, initiation of a displacement event to position an icon within an arrangement of icons contained in a user interface for a computing platform is detected. Responsive to the detection, multiple available displacement strategies implemented by the computing platform are evaluated and a displacement strategy for rearrangement of the arrangement to position the icon is selected based on the evaluation of the multiple available displacement strategies. Then, rearrangement of the arrangement of icons is controlled using the displacement strategy that is selected. In one approach, selection of a displacement strategy is based on an assessment of a level of disruption caused by the different displacement strategies. This may occur by checking disruptiveness of each strategy with respect to a particular rearrangement and selecting the least disruptive option. In addition or alternatively, displacement strategies may be checked in an established order from least to most perceived disruptiveness, in which case the first strategy checked that can successfully achieve the rearrangement is selected.

Selectively applying a set of multiple different displacement strategies as described herein provides a mechanism by which users are able to customize an arrangement of the icons one to another, such as by relocating or adding items, with minimal perturbance of the arrangements. As such, rearrangements are less likely to produce unacceptable results and can be accomplished more efficiently and in fewer steps than traditional techniques. In conjunction with functionality to choose applications and other content items for which icons are displayed and/or set the locations of the icons, the least disruptive icon displacement facilitates creation of a tailored user experience in which items the user considers most important are presented prominently and in easily accessible positions. Thus, limited screen real estate is used effectively to surface items of interest to the user and facilitate access to underlying content. As such, user satisfaction with the device and/or computing platform is increased.

In the following discussion, an example environment is first described that may employ the techniques described herein. Example devices, user interfaces, and procedures are then described which may be implemented within the example environment as well as in other environments. Consequently, implementation of the example devices, user interfaces and procedures is not limited to the example environment and the example environment is not limited to the example devices, user interfaces, and procedures.

Example Environment

FIG. 1 is an illustration of an environment 100 in an example implementation that is operable to employ techniques described herein. The illustrated environment 100 includes a computing device 102 and a service provider 104 having various resources 105 that are communicatively coupled via a network 106. The computing device may be configured in various ways to access and interact with various resources 105 (e.g., content and services) that are made available by the service provider 104 over the network 106. Resources 105 can include any suitable combination of content and/or services typically made available over a network by one or more service providers. For instance, content can include various combinations of text, video, ads, audio, multi-media streams, animations, images, webpages, and the like. Some examples of services include, but are not limited to, an online computing service (e.g., "cloud" computing), an authentication service, web-based applications, a file storage and collaboration service, a search service, messaging services such as email and/or instant messaging, and a social networking service. The computing device 102 and the service provider 104 may be implemented by a wide range of computing devices.

For example, a computing device 102 may be configured as a computer that is capable of communicating over the network 106, such as a desktop computer, a mobile station, an entertainment appliance, a tablet or slate device, a surface computing device, a set-top box communicatively coupled to a display device, a mobile communication device (e.g., a wireless phone as illustrated), a game console, and so forth. The computing device 102 may be configured as any suitable computing system and/or device that employ various processing systems, some additional examples of which are discussed in relation to the example system of FIG. 10.

The computing device 102 is further illustrated as including a processing system 108 and computer-readable media 110 through which various functionality described herein may be implemented. Details and examples of suitable processing systems and computer-readable media are also included below in the discussion of the example system of FIG. 10.

The computer-readable media 110 is depicted as storing example program modules representative of various functionality that may be executed via the processing system 108, including an operating system 112, applications 114, a notification system 116, and a display manager 118 that that operate as described herein. The display manager 118 may also include or otherwise make use of a displacement engine 119 to implement aspects of techniques for least disruptive icon displacement as discussed above and below. Although illustrated in the depicted example as standalone applications, the notification system 116, display manager 118, and displacement engine 119 may be combined together in different combinations and/or or with other applications 114, or may alternatively represent components integrated with the operating system 112.

Generally speaking, the operating system 112 is configured to abstract underlying functionality of the computing device 102 to applications 114 that are executable on the computing device 102. For example, the operating system 112 may abstract processing, memory, network, and/or display functionality of the computing device 102 such that the applications 114 may be written without knowing "how" this underlying functionality is implemented. The application 114, for instance, may provide data to the operating system 112 to be rendered and displayed by the display device without understanding how this rendering will be performed. The operating system 112 may provide various services, interfaces, and functionality that applications 114 may invoke to take advantage of system features. A variety of applications 114 to provide a wide range of functionality to the computing device 102 are contemplated including but not limited to a browser, an office productivity application, an email client, a multi-media management program, device management software, and/or networking applications, to name a few examples.

In one or more implementations, the operating system 112 is configured to facilitate interaction between applications 114 and the notification system 116 to obtain, configure, output and otherwise manage notifications that may be exposed via various user interfaces. Additionally, the operating system 112 may represent other functionality, such as to manage a file system and a user interface(s) navigable by a user of the computing device 102. An example of this is illustrated in FIG. 1 by the user interface 120 configured as start screen presented on a display device 122 for the computing device 102. As illustrated, the operating system 112 may provide a start screen or home page UI for the device that includes icons 124 (e.g., graphic representations) of a various applications 114 that may be configured in various ways, such as by using traditional icons, images, tiles, textual descriptions, and so forth. When implemented as tiles or other smart representations, the icons 124 may also incorporate live content that is associated with applications 114 including notifications. The start screen may include icons 124 or other representations of selected items from a hierarchical file structure of the file system managed by the operating system 112. The icons may be selectable to launch a corresponding one of applications 114 for execution on the computing device 102. In this way, a user may readily navigate through a file structure and initiate execution of applications of interest.

An arrangement of multiple icons provided by the user interface 120 may be configured as a paginated interface for the operating system 112 of the computing device 102. The paginated interface may provide multiple separate and distinct pages of icons to represent corresponding content items. In another example, an arrangement of multiple icons in the user interface may be configured as a scrollable, tile-based interface that operates as the start screen for the operating system 112 of the computing device 102. In this example, the start screen may include multiple different icons 124 in the form of tiles as illustrated in FIG. 1. The tiles may be configured to present live content associated with underlying applications and content items, such as presenting and updating various notifications from the notification system 116 using the tiles, as discussed herein.

The notification system 116 is representative of functionality to manage notifications such as for alerts, messages, updates, and/or other live content that may be displayed as part of the icon of the applications and via various user interfaces 120. The notification system 116 may operate to obtain various notifications on behalf of applications 114 that register with the notification system. Accordingly, the notifications may be handled by the notification system 116 without executing the corresponding applications 114. For example, the notification system 116 may receive notifications 116 from a variety of different sources, such as from software (e.g., other applications executed by the computing device 102), from a service provider 104 via the network 106, and so on.

For instance, the notification system 116 may interact with the service provider 104 to obtain notifications associated with various resources 105 using a push model, a pull model, or other suitable techniques suitable for obtaining notifications. The notification system 116 may then process the notifications and manage how the notifications are displayed as part of the representations and/or within various user interface without executing the applications 114. This approach may be used to improve battery life and performance of the computing device by not running each of the applications to handle the notifications.

The display manager 118 represents various functionality for managing display of the user interface(s) for the computing device 102 and associated icons. The display manager 118 may also be representative of functionality to manage customizations of the arrangement of icons or other representations presented via the user interface. For instance, the display manager 118 may be configured with a displacement engine 119 to implement techniques for least disruptive icon displacement described in this document. This may include but is not limited to performing operations to detect initiation of icon rearrangements, ascertain an appropriate displacement strategy to apply for the rearrangement from among multiple different displacement strategies supported for the particular computing platform (e.g., the particular device, hardware, and software configuration), and control rearrangement of icons using a selected one of the displacement strategies. In one or more implementations, an assessment of different available displacement strategies is made based at least in part upon a level of disruptiveness associated with each displacement strategies. Additionally, the display manager 118 may impose constraints on the rearrangement, such as by constraining the size and boundaries of the user interface, directions in which an arrangement of icons may shrink or grow, the size of icons to a set of predefined sizes, layout of the icons (e.g., in a grid, carousel, offset, or other layout), whether or not icons can overlap, arrangement of icons into groups, and so forth.

Having considered an example operating environment, consider now the following discussion of icon resizing implementation details that includes description of representative example procedures, scenarios, and user interfaces.

Least Disruptive Icon Displacement Implementation Details

As introduced above, a display manager 118 associated with a computing device 102 may be configured to obtain, generate, output, and otherwise manage various user interfaces 120 having arrangements of icons related to different applications and device functionality. This may include enabling users to customize the arrangements of icons by selectively applying a set of supported displacement strategies. Details regarding aspects of displacement strategies that may be used to effectuate least disruptive icon displacement are described in this section in relation to some example procedures and scenarios. The described procedures and scenarios may be implemented by way of suitably configured devices, such as by a computing device 102 of FIG. 1 that includes or otherwise make use of a notification system 116 and/or display manager 118.

The procedures described in this document may be implemented utilizing the previously described environment, system, devices, and components and in connection with any suitable hardware, software, firmware, or combination thereof. The procedures may be represented as a set of blocks that specify operations performed by one or more entities and are not necessarily limited to the orders shown for performing the operations by the respective blocks.

In general, functionality, features, and concepts described in relation to the examples above may be employed in the context of the example user interfaces and procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, user interfaces, and procedures herein may be used in any suitable combinations and are not limited to the particular combinations represented by the enumerated examples in this description.

Figure 2:
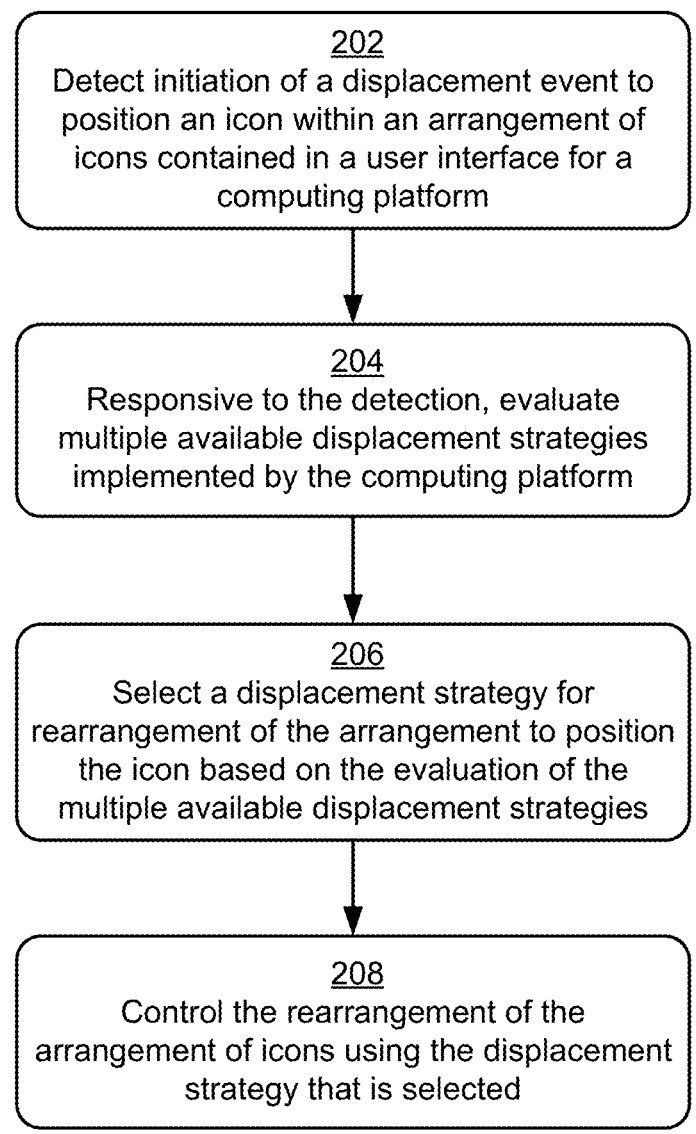
FIG. 2 is a flow diagram that depicts an example procedure to control rearrangement of icons in accordance with one or more implementations.

As an example, consider FIG. 2 which illustrates an example procedure 200 to control rearrangement of icons in accordance with one or more implementations. Initiation of a displacement event to position an icon within an arrangement of icons contained in a user interface for a computing platform is detected (block 202). A displacement event may relate to movement of an icon to a new position (e.g., repositioning) or insertion of a new icon into an existing arrangement. As such, detecting initiation of the displacement event may involve recognizing input to change a particular position of the icon within the arrangement and/or recognizing input to insert an additional icon at a position within the arrangement. The icon may be configured as a graphical representation of an application or other content item (e.g., file, group, object, entity) within the arrangement of multiple icons each of which configured to represent corresponding content items in a collection. In one or more implementations, the icons are each selectable to initiate interaction with corresponding content items, such as to launch a corresponding application, open a file, playback a media item, and so forth.

Generally speaking, input to trigger a displacement event can be accomplished in any suitable way such as, by way of example and not limitation, through a touch gesture or input pattern, natural user interface (NUI) gesture, an input device selection, and the like. For example, a user may select an icon the user would like to move using a defined gesture or action, such as a tap and hold on the icon, a pinch gesture, a keystroke, or a menu selection from a right-click menu using a mouse, to name a few examples. Similar selections may be made through an application/content picker configured to provide functionality to navigate and choose icons to add into the existing arrangement. In addition or alternatively, icons for newly installed applications or content items may be added automatically in established positions in the arrangement using the techniques discussed herein. In this case, the displacement event relates to download, installation, or other additions of content items to the computing platform. The display manager 118 may be configured to recognize these and other kinds of input to trigger a rearrangement.

Responsive to the detection, multiple available displacement strategies implemented by the computing platform are evaluated (block 204) and based on evaluation of the multiple available displacement strategies as noted above, a displacement strategy is selected for rearrangement of the arrangement to position the icon (block 206). For example, the display manager 118 by way of the displacement engine 119 may be configured to evaluate different displacement strategies according to criteria indicative of how disruptive the strategies are when applied to make a rearrangement. Such "disruptiveness criteria" may include but is not limited to feasibility of making the specified rearrangement, number of items moved, distance moved, size constraints set by the displacement engine, icon groupings established for the user interface, strategy-specific constraints for boundaries, layout, and/or permitted sizes, device capabilities, display size, and designated preferences for displacement direction, sizes, or non-movable items, and/or aesthetic aspects of the arrangement, to name a few examples. By way of example and not limitation, the multiple available displacement strategies may include one or any combination of empty space, adjacent space, chain displacement, or expand displacement strategies, details of which are discussed below in relation to FIGS. 4-7.

A level of disruptiveness may be derived on-demand for each strategy being evaluated as part of the evaluation using a combination or any one or more of the disruptiveness criteria. In addition or alternatively, a perceived level of disruptiveness may be pre-established with each strategy as part of development and/or configuration of the displacement engine, in which case the display manager 118 may be configured to utilize the pre-established disruptiveness levels to make assessments and select an appropriate strategies for different scenarios.

In this context, evaluation of strategies may involve assessing disruptiveness of each of the multiple available displacement strategies with respect to the rearrangement indicated by the displacement event that is detected. Then, a selected strategy is chosen as a least disruptive one of the multiple available displacement strategies in based on the disruptiveness assessment. Here, each available strategy may be individually tested with respect to a current displacement event and compared one to another according to a suitable disruptiveness measure to find the least disruptive option. In this manner, the evaluation of strategies is tailored to the specific interaction scenario for accurate selection of the least disruptive option on a case-by-case basis.

In another approach, pre-established disruptiveness levels are employed to establish an order for available displacement strategies from least to greatest perceived disruption. In this case, the strategies may be evaluated one by one in the established order. Then, a selected strategy is determined by finding the first one of the multiple available displacement strategies evaluated that satisfies any additional constraints imposed for the rearrangement as the selected strategy. If an evaluated strategy violates some constraint (such as moving items out of bounds), the strategy is eliminated and the next strategy in the order is evaluated. When a strategy is found that produces the rearrangement and does not violate constraints, the strategy is selected and applied. Since the strategies are evaluated in order, the selected strategy represents the least disruptive strategy that can be used to achieve the rearrangement. In this manner, the first strategy that works is selected and processing for other strategies is skipped, which avoids unnecessary processing, decreases time is takes to evaluate strategies, and conserves resources.

Once a strategy is selected, rearrangement of the arrangement of icons is controlled using the displacement strategy that is selected (block 208). Generally speaking, icons within the user interface are moved to different positions to accommodate the repositioning or insertion of the icon for which the displacement was initiated. Icons may be moved individually or in established groups. In order to control the rearrangement, the display manger may be configured to generate and send commands indicative of the rearrangement to direct operation of a graphics processing system to effectuate the rearrangement. For example, the commands may cause the graphics processing hardware to perform graphics processing operations to render a rearrangement of a visual representation of the arrangement of icons that is created using a selected displacement strategy. The commands may further cause output of the rearrangement for display on a display device, such as by controlling a display adapter, video controller, or other suitable hardware devices. Thru the rearrangement, a user is able to quickly locate and access underlying content thru a custom arrangement of icons reflected by the rearrangement.

Figure 3:
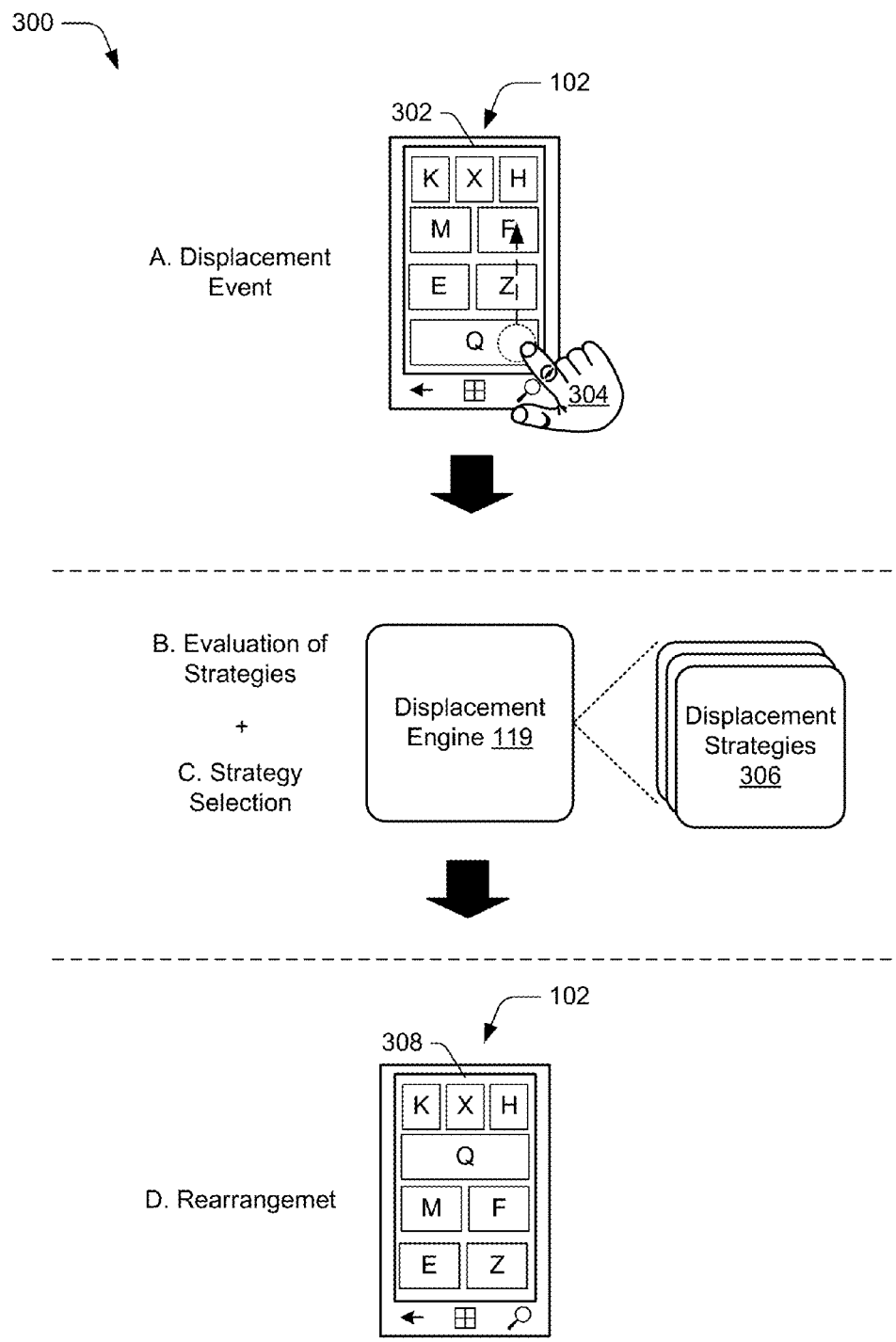
FIG. 3 depict example scenario for rearrangement in accordance with one or more implementations.

To further illustrate aspect of the described techniques, FIG. 3 depicts generally at 300 an example scenario for rearrangement in accordance with one or more implementations. The depicted example represents a sequence of operations that may be involved in producing a rearrangement of icons in accordance with techniques described herein. The operations are labeled using different letters A to D. At "A", a displacement event is initiated. In particular, an arrangement 302 of icons for a computing device 102 is represented. In this example, the arrangement 302 is configured as tiles configured in a grid pattern, although other arrangements are also contemplated. The example arrangement 302 corresponds to a start screen or application picker for the computing platform. Comparable techniques may be used with other collections of content items that are visually represented using icons or other graphics, such as a file system collection, picture library, media file browser screen, and so forth.

Interaction 304 with the arrangement 302 may occur to initiate the displacement event. Generally, the interaction 304 involves selection and positioning of one or more items within the arrangement 302. Various kinds of interaction 304 are contemplated such as touch input, defined gestures, menu item selections, operation of an input device, an automated rearrangement script, or other techniques to select and position items within the arrangement 302. Interaction 304 may include user action or automated actions to move an existing icon, add a new icon, position groups of two or more icons, and so forth.

In FIG. 3, interaction 304 is represented as a selection of an icon for an application Q by touch, and then dragging of the icon to a target position within the arrangement 302. This interaction may be detected by the display manager 118 as a displacement event. In response to detection of the displacement event, the display manager may invoke or otherwise interact with the displacement engine 119 to handle the displacement event using techniques described herein. Handling of the displacement event involves selectively applying a plurality of displacement strategies 306 that are made available via the displacement engine 119 as represented in FIG. 3.

In particular, at "B" evaluation of strategies occurs. Evaluation of displacement strategies 306 may occur in various ways described in this document, including but not limited to the techniques discussed in relation to example procedure 200 of FIG. 2. Then at "C", strategy selection occurs based on the evaluation. As noted previously, the strategy selection is intended to find a strategy from among the plurality of displacement strategies 306 that is the least disruptive to the arrangement 302. At "D", rearrangement of the arrangement 302 of icons occurs to produce a rearranged view 308 of the icons as depicted on FIG. 3. In the example rearranged view 302, space is made for insertion of the icon for application Q at a designated position by shifting icons for applications M, F, E, and Z downward. The action taken for the rearrangement reflects evaluation of various possible strategies and selection of a "best option" that is the least disruptive based on a defined measure of disruptiveness. Further details regarding displacement strategies and some examples of displacement strategies are discussed just below.

Displacement Strategy Examples

A variety of different displacement strategies may be defined and utilized in conjunction with the techniques described herein. In general, each individual strategy defines rules for handling rearrangements when the individual strategy is applied to control the rearrangement. The rules may reflect various different displacement criteria, preferences, objectives, and constraints for rearranging the icons. Rules may depend upon factors such as the characteristics and capabilities of the device, screen size, display orientation, content type, user interface and/or application type, and so forth. As such, the displacement engine 119 is configured to provide a flexible rules-based approach to defining different strategies that may be applied in different scenarios that correspond to different combinations of these and other factors. Moreover, different strategies may relate to and be activated based on factors such as those enumerated herein. Thus, different devices, platforms, UIs and so forth may utilize different combinations of strategies that are selected from a larger pool of strategies available via the displacement engine 119. Some example displacement strategies include but are not limited to empty space, adjacent space, chain displacement, and expand displacement strategies, which are discussed in turn in relation to the following figures.

Figure 4:
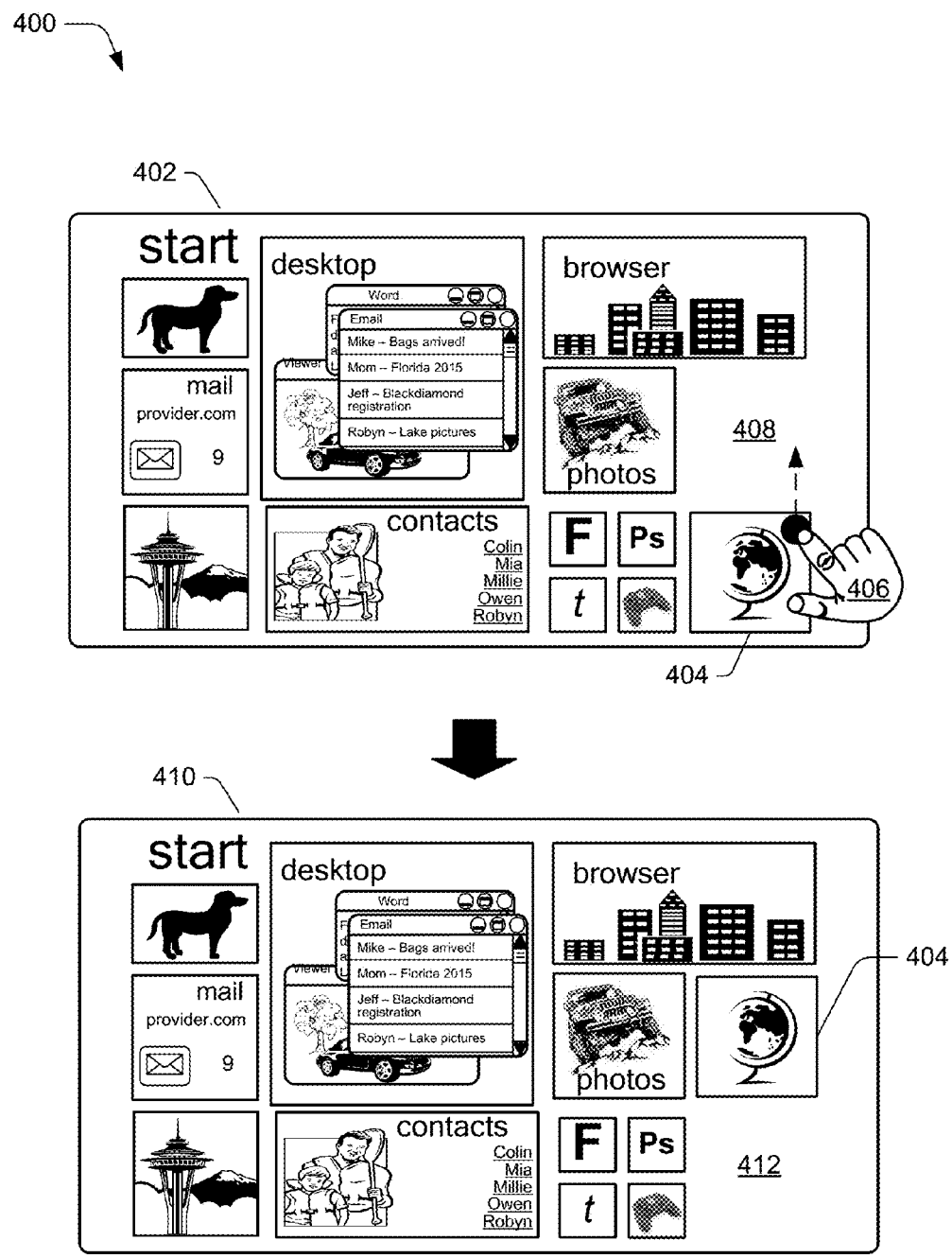
FIG. 4 illustrates an example scenario for an empty space displacement strategy in accordance with one or more implementations.

FIG. 4 illustrates generally at 400 an example scenario for an empty space displacement strategy in accordance with one or more implementations. In general, the empty space displacement strategy is employed when a displacement event attempts to position an item into an area of empty space. The rules for the empty space displacement strategy specify that the attempted displacement event will succeed if the target position for the moved or added icon is empty. Otherwise the displacement event is prohibited and will fail. In this context, the example of FIG. 4 depicts an arrangement 402 of a plurality of icons. In this example, the arrangement 402 represents a start screen for a tablet or slate device. A subject icon 404 is depicted as being selected by interaction 406 and moved to a target position 408. Here, the target position 408 is a gap of empty space within the arrangement 402. Thus, the rules specified for the empty space displacement strategy indicate that the displacement can be successfully executed. Accordingly, the empty space displacement strategy can be used to create the rearrangement 410 as in FIG. 4 in which the subject icon 404 is relocated to the empty space 408. A new portion of empty space 412 is produced as a part of the rearrangement. A comparable approach may occur if addition of a new icon is attempted to either the empty space 408 in the arrangement 402 or the empty space 412 created in the rearrangement.

On the other hand, if an attempt is made to locate the subject icon 404 in occupied space, the empty space displacement strategy fails. In traditional techniques that use a single fixed displacement strategy, failure of the one available strategy would prevent relocation to the desired position. The user may then have to select a different location, or move multiple icons individually to clear open space and then move the subject icon to the clear out area, which is time consuming and takes a number of steps. In accordance with techniques discussed herein, however, multiple different strategies are available and may be evaluated for a given scenario in response to single displacement event. Thus, the techniques that make use of a set of multiple different strategies as described herein enable a viable strategy for a rearrangement to be found even if one or more evaluated strategies fail. The work of assessing the different strategies and selecting the best option is handled by the displacement engine 119. As a result, rearrangements can occur with fewer steps and/or using less computing resources.

Figure 5:
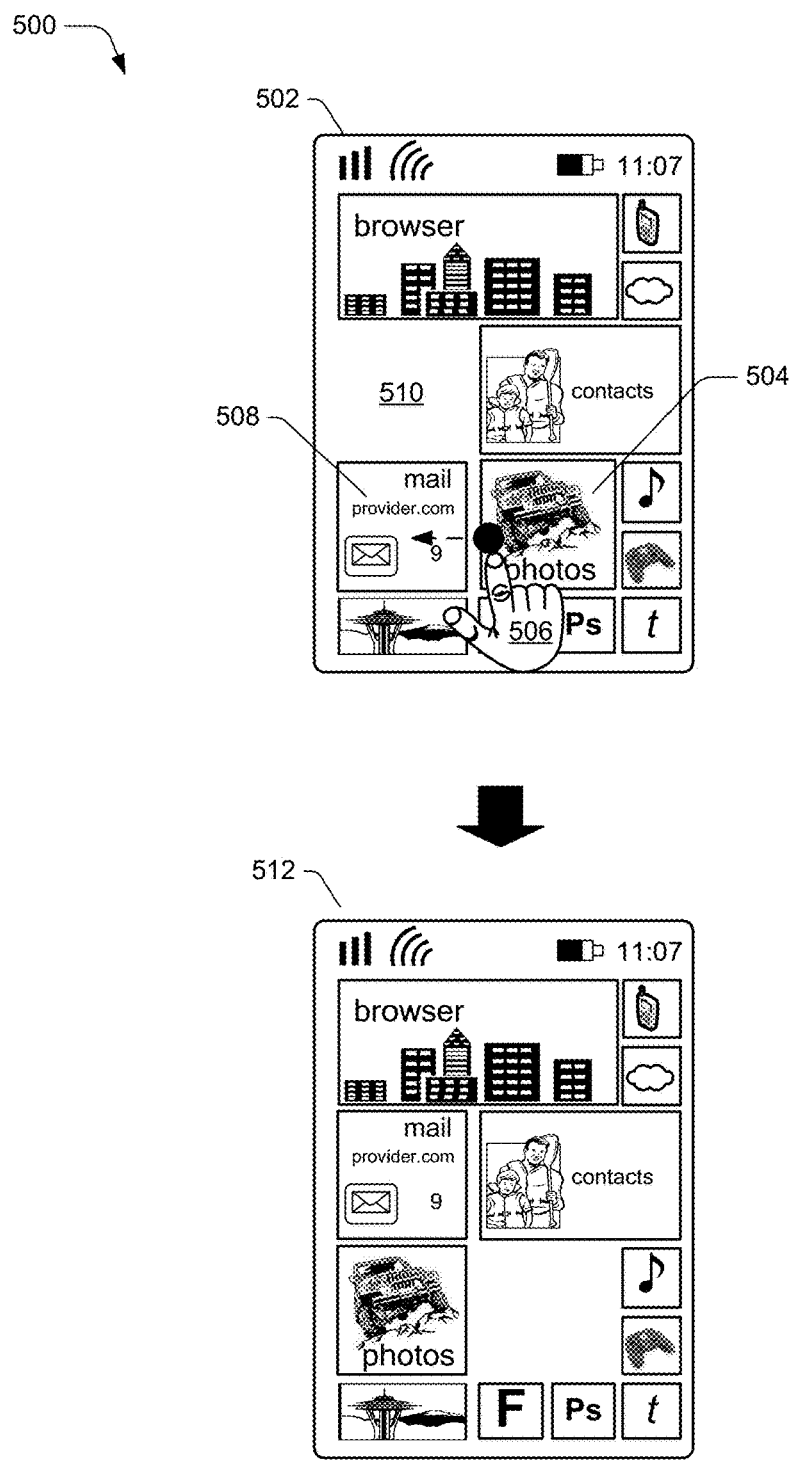
FIG. 5 illustrates an example scenario for an adjacent space displacement strategy in accordance with one or more implementations.

FIG. 5 illustrates generally at 500 an example scenario for an adjacent space displacement strategy in accordance with one or more implementations. In general, the adjacent space displacement strategy is employed when a displacement event attempts to position an item into an area of occupied space. The rules for the adjacent space displacement strategy specify that the attempted displacement event will succeed if sufficient empty space exists adjacent to the occupied space to accommodate displacement of one or more icons contained in the occupied space. Otherwise the displacement event is prohibited and will fail.

In this context, the example of FIG. 5 depicts an arrangement 502 of a plurality of icons, which in this example represents an application picker page for a smartphone device. A subject icon 504 is depicted as being selected by interaction 506 and moved to a target position, which in this example is occupied by another icon 508. Accordingly, the rules specified for the adjacent space displacement strategy trigger an evaluation of the availability of adjacent space surrounding the target position. In an implementation, an assessment may be made of adjacent space that is available in each direction (e.g., top, bottom, left, right, etc.) around the target. In this example, adjacent space 510 is available above the icon 508. As such, the adjacent space displacement strategy can be used to create the rearrangement 512 as in FIG. 5 in which the subject icon 504 is relocated to the previous position of icon 508, and the icon 508 is relocated to the adjacent space 510.

It is noted, that the adjacent space strategy, as well as other strategies, may be applied subject to different constraints and/or preferences. For instance, in the example arrangement of FIG. 5, the interface may have boundaries on the vertical and/or horizontal edges. Generally, movement that results in displacing an item "out-of-bounds" is prohibited. In the case of multiple viable adjacent spaces, the disruptiveness of each option may be computed and the least disruptive option selected in the manner described herein. Preferences for displacement may also be used, such as to resolve ties in disruptiveness assessments or eliminate some non-preferred options. For example preferences may indicate that a particular direction of displacement is preferred, give priority to movement into previously unoccupied space vs space created due to the current rearrangement, set some non-movable positions/icons, and so forth.

Figure 6:
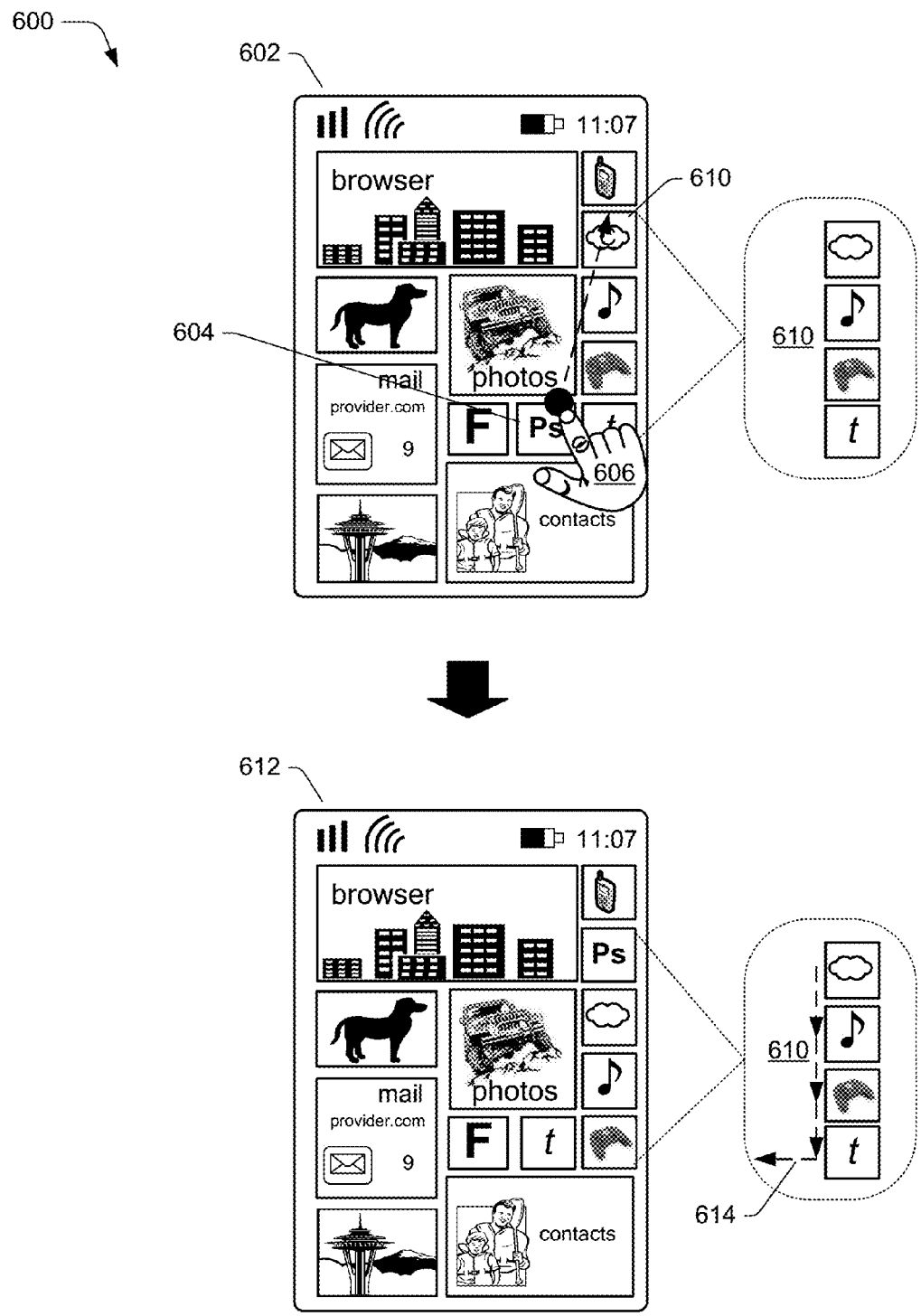
FIG. 6 illustrates an example scenario for a chain displacement strategy in accordance with one or more implementations.

FIG. 6 illustrates generally at 600 an example scenario for a chain displacement strategy in accordance with one or more implementations. In general, the chain displacement strategy is employed to relocate a group of icons in a chain when a displacement event attempts to position an item into an area of occupied space. In effect, the chain displacement strategy operates to push an icon that overlaps a target position out of the way to make room for a subject icon that is being moved or added. The pushed icon pushes another adjacent icon and so on in a chain until empty space to accommodate the items at the end of the chain is encountered. For a given displacement event, one or more possible chains may be identified and evaluated for handling a rearrangement. Chains may involve movement in each coordinate direction as long as boundaries and other constraints are not violated. In the case of multiple possible chains, a disruptiveness assessment may be employed to select the least disruptive option. On the other hand, if a suitable chain is not available, the chain displacement strategy fails.

In this context, the example of FIG. 6 depicts an arrangement 602 of a plurality of icons, which again represents an application picker page for a smartphone device. A subject icon 604 is depicted as being selected by interaction 606 and moved to a target position, which in this example is occupied by another icon 608. One or more potential chains of icons may be identified and evaluated as candidates for displacement, as represented by the example chain 610 depicted in FIG. 6. In particular, the chain displacement strategy determines whether viable options for chain displacement exist and selects the least disruptive option from among the viable options. Thus, the chain displacement strategy can be used to identify the representative chain 610 and create the rearrangement 612 as in FIG. 6. The rearrangement 612 is created by movement 614 of the chain 610 down and to the left as represented in FIG. 6

Figure 7:
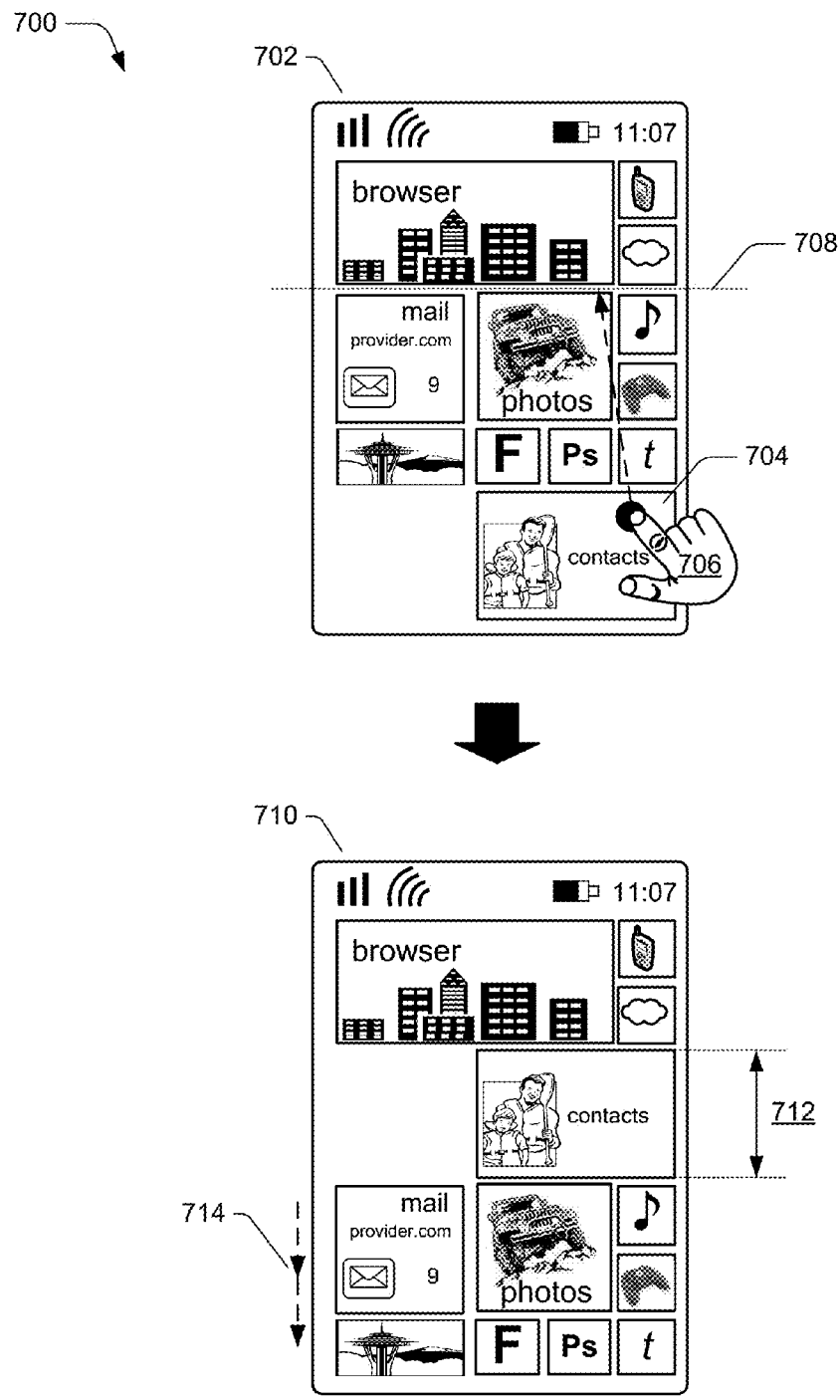
FIG. 7 illustrates an example scenario for a expand displacement strategy in accordance with one or more implementations.

FIG. 7 illustrates generally at 700 an example scenario for an expand displacement strategy in accordance with one or more implementations. In general, the expand displacement strategy is employed to create new empty space within an arrangement to accommodate a moved or added icon. In other words, expansion of the arrangement occurs to make space at a target position. For example, in a grid arrangement the expand displacement strategy operates to create new rows or columns. The created empty space may be configured to match a dimension (e.g., height or width) of the subject icon. The rules for the empty space displacement strategy operate to define a cut-line and move items away from the cut-line to produce sufficient space for the subject icon in a designated position. Shifting of items may occur in each coordinate direction and even in multiple directions away from the cut-line. In one approach a preferred direction(s) for shifts is specified (e.g., down for vertical expansion and right for horizontal expansion), in which case shifting occurs in accordance with the preferred direction(s).

In this context, the example of FIG. 7 depicts an arrangement 702 of a plurality of icons, which again represents an application picker page for a smartphone device. A subject icon 704 is depicted as being selected by interaction 706 and moved to a target position, which in this example is at a boundary 708. In this example, the boundary 708 is selected as the cut-line for expansion of the arrangement 702 via the expand displacement strategy. Thus, the expand displacement strategy can be used to create the rearrangement 710 as in FIG. 7 in which a new row 712 is inserted at the cut-line 708 to accommodate the subject icon 706. The row 712 is sized based on dimensions of the subject icon 704. A displacement 714 of icons downward below the cut-line occurs to make room for the row 712. Comparable techniques may be employed to insert new rows in other scenarios.

Figure 8:
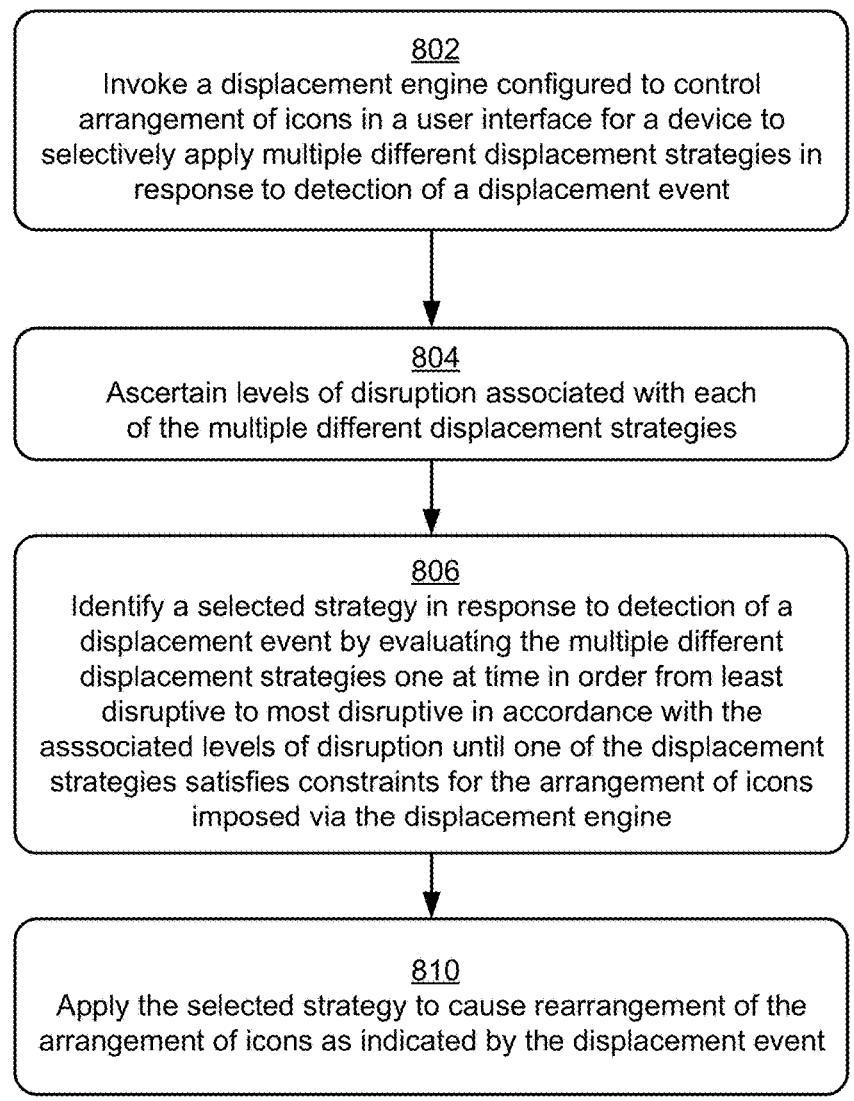
FIG. 8 is a flow diagram that depicts an example procedure for rearranging of an arrangement of icons using ordered displacement strategies in accordance with one or more implementations.

Having considered some example displacement strategies, consider now some additional procedures related to least disruptive icon displacement techniques as described throughout this document. In particular, FIG. 8 is a flow diagram that depicts an example procedure 800 for rearranging of an arrangement of icons using ordered displacement strategies in accordance with one or more implementations.

A displacement engine is invoked that is designed to control an arrangement of icons in a user interface for the computing device by selectively applying multiple different displacement strategies in response to detection of a displacement event (block 802). For example, a display manager 118 of a computing device 102 may operate to detect various displacement events as discussed previously. The display manager 118 includes or makes use of a displacement engine 119 that can be invoked to handle the displacement events.

In one or more implementations, the displacement engine 119 is configured with a pool of displacement strategies available to use across multiple different devices having different capabilities. Multiple different displacement strategies that match capabilities of computing device on which the displacement engine 119 is operating may be selected from the pool of displacement strategies. In this way, the displacement engine 119 is constrained to evaluating displacement strategies that are appropriate for the device, which prevents unnecessary processing and consumption of resources to evaluate strategies that are not a match for the device.

In order to handle displacement events, levels of disruption associated with each of the multiple different displacement strategies are ascertained (block 804). Then, a selected strategy is identified by evaluating the multiple different displacement strategies one at time in order from least disruptive to most disruptive in accordance with the associated levels of disruption until one of the displacement strategies satisfies constraints for the arrangement of icons imposed via the displacement engine (block 806). Here, the displacement engine 119 operates to evaluate selected strategies in succession until a strategy that can execute the specified rearrangement is encountered. The strategies are tested in order of disruptiveness. The order may be based on pre-established disruptiveness levels as discussed previously. In addition or alternatively, disruptiveness levels may be assigned as part of the evaluation and used to produce the order that is used for assessment of the individual strategies. Thereafter, the selected strategy is applied to cause rearrangement of the arrangement of icons as indicated by the displacement event (block 808).

Figure 9:
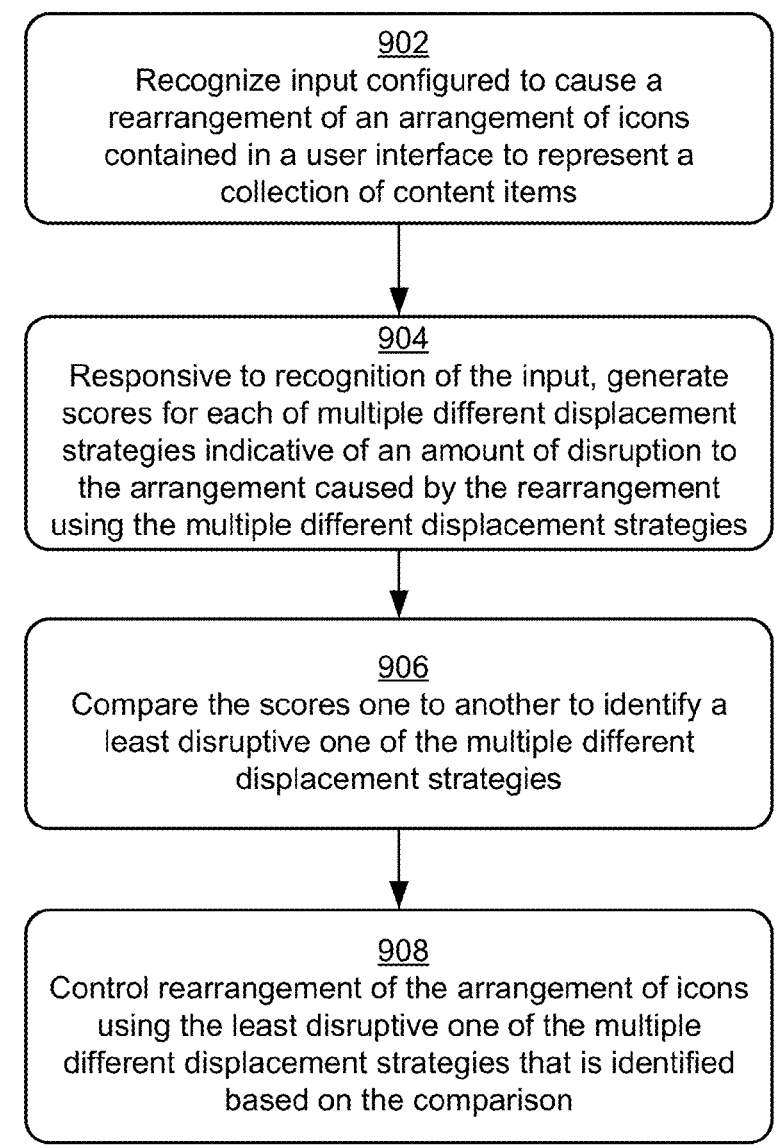
FIG. 9 is a flow diagram that depicts an example procedure for rearranging of an arrangement of icons based on disruptiveness scores in accordance with one or more implementations.

FIG. 9 is a flow diagram that depicts an example procedure 900 for rearranging of an arrangement of icons based on disruptiveness scores in accordance with one or more implementations. Input configured to cause a rearrangement of an arrangement of icons contained in a user interface to represent a collection of content items is recognized (block 902). Responsive to recognition of the input, scores are generated for each of multiple different displacement strategies indicative of an amount of disruption to the arrangement caused by the rearrangement using the multiple different displacement strategies (block 904). Various different displacement strategies are contemplated details and examples of which are discussed throughout this document. Each individual strategy defines a set of corresponding rules for handling rearrangements when the individual strategy is applied to control the rearrangement. The scores may reflect levels of disruptiveness computed as an arithmetic combination of disruptiveness criteria, which include but are not limited to one or more of a feasibility factor, number of tiles moved, distance moved, strategy-specific constraints, or designated preferences.

The scores can be utilized to perform a disruptiveness assessment of the different displacement strategies. In particular, the scores are compared one to another to identify a least disruptive one of the multiple different displacement strategies (block 906). For example, strategies may be analyzed, ranked, filtered and/or otherwise compared according to the scores. A strategy having a score associated with the least disruption is identified and selected based on the comparison. Then, rearrangement of the arrangement of icons is controlled using the least disruptive one of the multiple different displacement strategies that is identified based on the comparison. (block 908).

Having considered example implementation details, consider now the following discussion of an example system which may be employed in one or more implementations to provide least disruptive icon displacement described herein.

Example System

Figure 10:
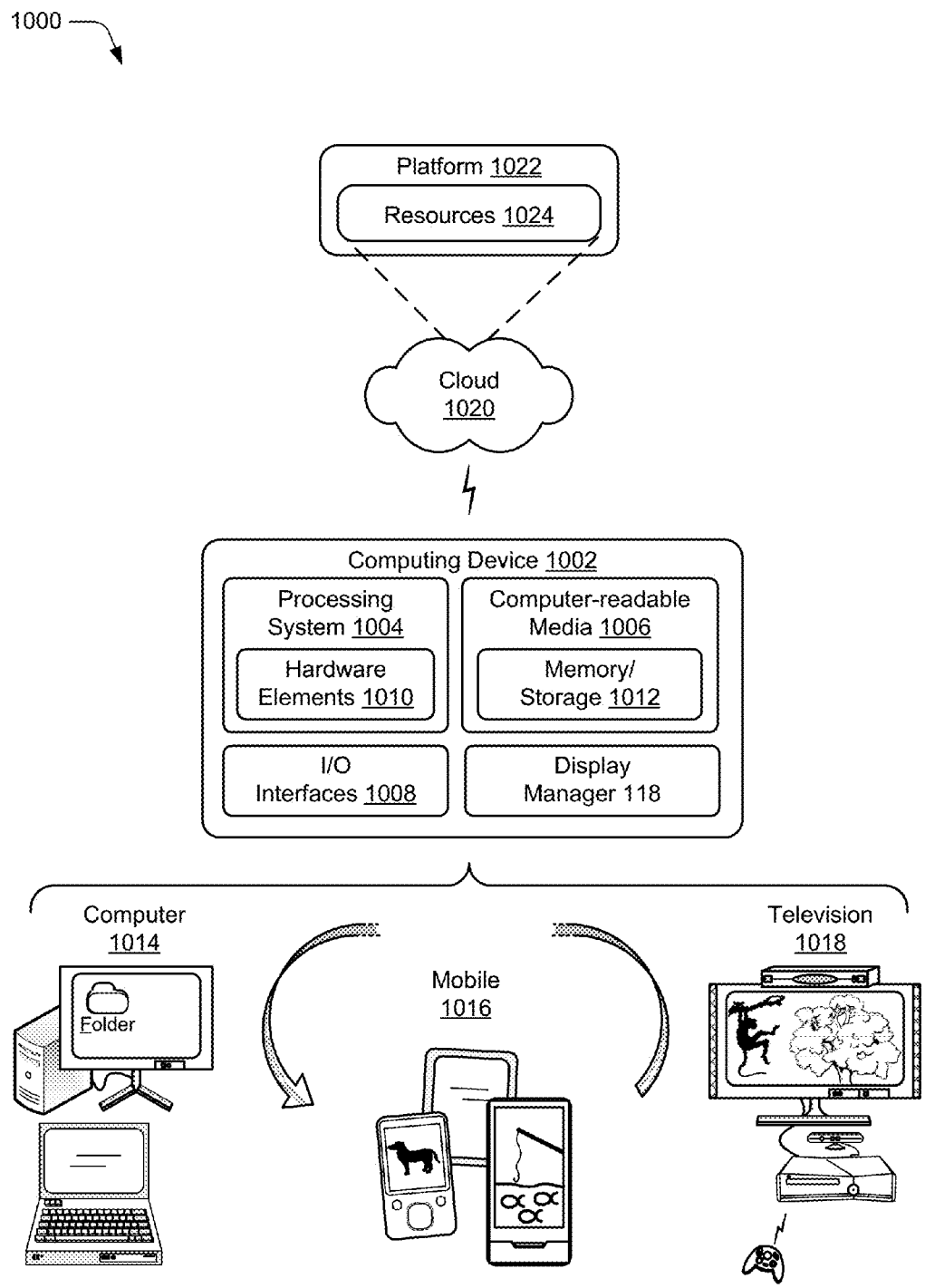
FIG. 10 illustrates an example system and components that can be configured as any type of system or device to implement aspects of the techniques described herein.

FIG. 10 illustrates an example system 1000 that includes an example computing device 1002 that is representative of one or more computing systems and/or devices that may implement the various techniques described herein. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Thus, computer-readable storage media does not include signal bearing media, transitory signals, or signals per se. The computer-readable storage media includes hardware such as volatile and nonvolatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to signal-bearing media that is configured to transmit instructions to the hardware of the computing device 1002, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including the operating system 112, applications 114, notification system 116, display manager 118, displacement engine 119, and other program modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of modules as a module that is executable by the computing device 1002 as software may be achieved at least partially in hardware, e.g., through use of computer-readable storage media and/or hardware elements 1010 of the processing system. The instructions and/or functions may be executable/operable by one or more articles of manufacture (for example, one or more computing devices 1002 and/or processing systems 1004) to implement techniques, modules, and examples described herein.

As further illustrated in FIG. 10, the example system 1000 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1000, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1002 may assume a variety of different configurations, such as for computer 1014, mobile 1016, and television 1018 uses. Each of these configurations includes devices that may have generally different constructs and capabilities, and thus the computing device 1002 may be configured according to one or more of the different device classes. For instance, the computing device 1002 may be implemented as the computer 1014 class of a device that includes a personal computer, desktop computer, a multi-screen computer, laptop computer, netbook, and so on.

The computing device 1002 may also be implemented as the mobile 1016 class of device that includes mobile devices, such as a mobile phone, portable music player, portable gaming device, a tablet computer, a multi-screen computer, and so on. The computing device 1002 may also be implemented as the television 1018 class of device that includes devices having or connected to generally larger screens in casual viewing environments. These devices include televisions, set-top boxes, gaming consoles, and so on.

The techniques described herein may be supported by these various configurations of the computing device 1002 and are not limited to the specific examples of the techniques described herein. This is illustrated through inclusion of the display manger 118 on the computing device 1002. The functionality represented by the display manger 118 and other modules/applications may also be implemented all or in part through use of a distributed system, such as over a "cloud" 1020 via a platform 1022 as described below.

The cloud 1020 includes and/or is representative of a platform 1022 for resources 1024. The platform 1022 abstracts underlying functionality of hardware (e.g., servers) and software resources of the cloud 1020. The resources 1024 may include applications and/or data that can be utilized while computer processing is executed on servers that are remote from the computing device 1002. Resources 1024 can also include services provided over the Internet and/or through a subscriber network, such as a cellular or Wi-Fi network.

The platform 1022 may abstract resources and functions to connect the computing device 1002 with other computing devices. The platform 1022 may also serve to abstract scaling of resources to provide a corresponding level of scale to encountered demand for the resources 1024 that are implemented via the platform 1022. Accordingly, in an interconnected device embodiment, implementation of functionality described herein may be distributed throughout the system 1000. For example, the functionality may be implemented in part on the computing device 1002 as well as via the platform 1022 that abstracts the functionality of the cloud 1020.

EXAMPLE IMPLEMENTATIONS

Example implementations of least disruptive icon displacement techniques described herein include, but are not limited to, one or any combinations of one or more of the following examples:

Example 1

A method implemented by a computing device to control an arrangement of icons and facilitate user access to content represented by the icons comprising: detecting initiation of a displacement event to position an icon within an arrangement of icons contained in a user interface for a computing platform; responsive to the detection, evaluating multiple available displacement strategies implemented by the computing platform; selecting a displacement strategy for rearrangement of the arrangement to position the icon based on the evaluation of the multiple available displacement strategies; and controlling the rearrangement of the arrangement of icons using the displacement strategy that is selected.

Example 2

The computer-implemented method as described in any one or more of the examples in this section, wherein detecting initiation of the displacement event comprises recognizing input to change a position of the icon within the arrangement.

Example 3

The computer-implemented method as described in any one or more of the examples in this section, wherein detecting initiation of the displacement event comprises recognizing input to insert an additional icon at a position within the arrangement.

Example 4

The computer-implemented method as described in any one or more of the examples in this section, wherein evaluating the multiple available displacement strategies comprises: assessing disruptiveness of each of the multiple available displacement strategies with respect to the rearrangement indicated by the displacement event that is detected; and selecting the selected strategy as a least disruptive one of the multiple available displacement strategies in accordance with the assessing disruptiveness.

Example 5

The computer-implemented method as described in any one or more of the examples in this section, evaluating the multiple available displacement strategies comprises: establishing an order for the multiple available displacement strategies from least to greatest perceived disruption caused by application of the multiple available displacement strategies to position the icon; and evaluating the multiple available displacement strategies one by one in the established order.

Example 6

The computer-implemented method as described in any one or more of the examples in this section, wherein selecting the displacement strategy for the rearrangement comprises, as part of evaluating the multiple available displacement strategies one by one, selecting a first one of the multiple available displacement strategies evaluated that satisfies constraints imposed for the rearrangement as the selected strategy.

Example 7

The computer-implemented as described in any one or more of the examples in this section, wherein the multiple available displacement strategies include one or more of: empty space, adjacent space, chain displacement, or expand displacement strategies.

Example 8

The computer-implemented method as described in any one or more of the examples in this section, wherein evaluating comprises evaluating disruptiveness associated with using each of the multiple available displacement strategies for the rearrangement according to disruptiveness criteria including feasibility, number of items moved, distance moved, size constraints, icon groupings, strategy-specific constraints, and designated preferences.

Example 9

The computer-implemented method as described in any one or more of the examples in this section, wherein controlling the rearrangement comprises sending commands indicative of the rearrangement to direct operation of a graphics processing system to effectuate the rearrangement in a visual representation of the arrangement of icons rendered for display via a display device associated with the computing device.

Example 10

The computer-implemented method as described in any one or more of the examples in this section, wherein the icon comprises a representation of an application within the arrangement of multiple icons each of the icons configured to represent corresponding content items and selectable to initiate interaction with corresponding content items.

Example 11

A computing device comprising: a processing system; one or more computer readable storage media storing instructions that, when executed by the processing system, implement a display manager configured to perform operations to control an arrangement of icons and facilitate user access to content represented by the icons comprising: invoking a displacement engine designed to control the arrangement of icons in a user interface for the computing device by selectively applying multiple different displacement strategies in response to detection of a displacement event; ascertaining levels of disruption associated with each of the multiple different displacement strategies; identifying a selected strategy in response to detection of a displacement event by evaluating the multiple different displacement strategies one at time in order from least disruptive to most disruptive in accordance with the associated levels of disruption until one of the displacement strategies satisfies constraints for the arrangement of icons imposed via the displacement engine; and applying the selected strategy to cause rearrangement of the arrangement of icons as indicated by the displacement event.

Example 12

The computing device as described in any one or more of the examples in this section, wherein the multiple available displacement strategies include at least empty space, adjacent space, chain displacement, and expand displacement strategies.

Example 13

The computing device as described in any one or more of the examples in this section, wherein the display manager is further configured to perform operations comprising: selecting the multiple different displacement strategies to match capabilities of the computing device from a pool of displacement strategies available across multiple different devices having different capabilities; and constraining the displacement engine to use of the multiple different displacement strategies that match capabilities of the computing device for handling of displacement events for the computing device.

Example 14

The computing device as described in any one or more of the examples in this section, wherein the arrangement of multiple icons in the user interface comprises a paginated interface for an operating system of the computing device.

Example 15

The computing device as described in any one or more of the examples in this section, wherein the arrangement of multiple icons in the user interface comprises a scrollable, tile-based interface configured as a start screen for an operating system of the computing device.

Example 16

One or more computer readable storage media storing computer-readable instructions which, when executed by a processing system, implement a display manager configured to perform operations comprising: recognizing input configured to cause a rearrangement of an arrangement of icons contained in a user interface to represent a collection of content items; responsive to recognition of the input, generating scores for each of multiple different displacement strategies indicative of an amount of disruption to the arrangement caused by the rearrangement using the multiple different displacement strategies; comparing the scores one to another to identify a least disruptive one of the multiple different displacement strategies; and controlling rearrangement of the arrangement of icons using the least disruptive one of the multiple different displacement strategies that is identified based on the comparison.

Example 17

The one or more computer readable storage media as described in any one or more of the examples in this section, wherein the rearrangement comprises relocating one or more of the multiple icons within the arrangement.

Example 18

The one or more computer readable storage media as described in any one or more of the examples in this section, wherein the scores reflect levels of disruptiveness computed as a arithmetic combination of disruptiveness criteria including one or more of a feasibility factor, number of tiles moved, distance moved, strategy-specific constraints, or designated preferences.

Example 19

The one or more computer readable storage media as described in any one or more of the examples in this section, wherein each individual strategy of the multiple different displacement strategies defines a set of corresponding rules for handling rearrangements when the individual strategy is applied to control the rearrangement.

Example 20

The one or more computer readable storage media as described in any one or more of the examples in this section, wherein arrangement of icons in the user interface comprises a scrollable, grid-based tile arrangement in which the icons are configured as tile elements sizable to a plurality of predefined sizes and positionable to different coordinate positions within a grid layout for the user interface.

CONCLUSION

Although techniques and aspects have been described in language specific to structural features and/or methodological acts, it is to be understood that the subject matter defined in the appended claims are not necessarily limited to the specific features or acts described. Rather, the specific features and acts are disclosed as example forms of implementing the claimed subject matter.

What is claimed is:
1. A method implemented by a computing device comprising:
   detecting initiation of a displacement event to position an icon within an arrangement of icons contained in a user interface for a computing platform;
   responsive to the initiation of the displacement event, evaluating a plurality of rule sets that correspond to multiple available displacement strategies implemented by the computing platform, wherein individual rule sets of the plurality of rule sets correspond to individual displacement strategies of the multiple available displacement strategies, the evaluating including determining disruptiveness scores associated with using the individual rule sets of the plurality of rule sets for rearrangement of the arrangement of icons, wherein the disruptiveness scores indicate at least a number of the icons displayed in the user interface being moved based on the individual rule sets and a distance that the number of the icons would be moved based on the individual rule sets;

selecting a particular displacement strategy, for the rearrangement of the arrangement of icons, based on a particular rule set of the particular displacement strategy corresponding to:
a least number of icons that would be moved as compared to other rule sets of the plurality of rule sets, and
a least amount of the distance that the least number of the icons would be moved; and
controlling the rearrangement of the arrangement of icons using the particular rule set of the particular displacement strategy.

2. The computer-implemented method of claim 1, wherein the detecting the initiation of the displacement event comprises recognizing input to change a position of the icon within the arrangement of icons.

3. The computer-implemented method of claim 1, wherein the detecting the initiation of the displacement event comprises recognizing input to insert an additional icon at a position within the arrangement of icons.

4. The computer-implemented method of claim 1, wherein the evaluating the multiple available displacement strategies comprises:
establishing an order for the multiple available displacement strategies from a least disruptiveness score to a greatest disruptiveness score caused by application of the multiple available displacement strategies to position the icon; and
evaluating the multiple available displacement strategies one by one in the established order.

5. The computer-implemented method of claim 1, wherein the multiple available displacement strategies include one or more of: empty space, adjacent space, chain displacement, or expand displacement strategies.

6. The computer-implemented method of claim 1, wherein the disruptiveness scores are determined based on one or more of feasibility, size constraints, icon groupings, strategy-specific constraints, and designated preferences.

7. The computer-implemented method of claim 1, wherein the controlling the rearrangement comprises sending commands indicative of the rearrangement to direct operation of a graphics processing system to effectuate the rearrangement in a visual representation of the arrangement of icons rendered for display via a display device associated with the computing device.

8. The computer-implemented method of claim 1, wherein the icon comprises a representation of an application within the arrangement of icons, each of the icons configured to represent corresponding content items and selectable to initiate interaction with corresponding content items.

9. A computing device comprising:
a processing system;
one or more computer readable storage media storing instructions that, when executed by the processing system, implement a display manager configured to perform operations comprising:
invoking a displacement engine designed to control an arrangement of icons in a user interface for the computing device by selectively applying multiple different displacement strategies in response to detection of a displacement event, wherein individual displacement strategies correspond to individual rule sets that are usable to complete the displacement event;
in response to the detection of the displacement event, generating disruptiveness scores associated with using individual ones of the multiple different displacement strategies to complete the displacement event, wherein the generating the disruptiveness scores includes at least:
determining individual numbers of the icons, displayed in the user interface, that the individual rule sets would cause to be moved to complete the displacement event; and
determining individual distances that the individual rules sets would cause to the individual numbers of the icons to be moved;
identifying a selected strategy that corresponds to a least disruptiveness score of the disruptiveness scores that are generated by determining the individual numbers and the individual distances; and
applying the selected strategy to cause rearrangement of the arrangement of icons as indicated by the displacement event.

10. The computing device of claim 9, wherein the multiple different displacement strategies include at least empty space, adjacent space, chain displacement, and expand displacement strategies.

11. The computing device of claim 9, wherein the multiple different displacement strategies are selected to match the capabilities of the computing device from a pool of displacement strategies available across multiple different devices having different capabilities.

12. The computing device of claim 9, wherein the arrangement of icons in the user interface comprises a paginated interface for an operating system of the computing device.

13. The computing device of claim 9, wherein the arrangement of icons in the user interface comprises a scrollable, tile-based interface configured as a start screen for an operating system of the computing device.

14. One or more computer readable storage media storing computer-readable instructions which, when executed by a processing system, implement a display manager configured to perform operations comprising:
recognizing input configured to cause a displacement event in association with an arrangement of icons contained in a user interface, wherein individual icons represent individual content items of a collection of content items;
responsive to the input:
generating a first disruptiveness score for a first displacement strategy of multiple different displacement strategies, the first disruptiveness score indicative of at least a first number of the icons that one or more first rules, of the first displacement strategy, would cause to be moved and a first distance that the one or more first rules would cause the first number of the icons to be moved;
generating a second disruptiveness score for a second displacement strategy of the multiple different displacement strategies, the second disruptiveness score indicative of at least a second number of the icons that one or more second rules, of the second displacement strategy, would cause to be moved and a second distance that the one or more second rules would cause the second number of the icons to be moved;
comparing at least the first disruptiveness score to the second disruptiveness score to identify that completing the displacement event in accordance with the first displacement strategy will result in less perceived disruption than completing the displacement event in accordance with the second displacement strategy; and based on the comparing, completing the displacement event in accordance with the first displacement strategy by implementing the one or more first rules to move the first number of the icons the first distance.

15. The one or more computer readable storage media of claim 14, wherein the displacement event comprises relocating one or more of the icons within the arrangement of icons.

16. The one or more computer readable storage media of claim 14, wherein the first disruptiveness score and the second disruptiveness score are further based on one or more of a feasibility factor, strategy-specific constraints, or designated preferences.

17. The one or more computer readable storage media of claim 14, wherein each individual strategy of the multiple different displacement strategies defines a set of corresponding rules for handling rearrangements when the individual strategy is applied to control the displacement event.

18. The one or more computer readable storage media of claim 14, wherein the arrangement of icons in the user interface comprises a scrollable, grid-based tile arrangement in which the icons are configured as tile elements sizable to a plurality of predefined sizes and positionable to different coordinate positions within a grid layout for the user interface.

19. The one or more computer readable storage media of claim 14, wherein the first displacement strategy is an adjacent space displacement strategy.

20. The one or more computer readable storage media of claim 19, wherein the second displacement strategy is a chain displacement strategy.

* * * * *